United States Patent [19]

McQueen, III et al.

[11] Patent Number: 5,586,242
[45] Date of Patent: Dec. 17, 1996

[54] FONT MANAGER WITH SELECTIVE ACCESS OF INSTALLED FONTS

[75] Inventors: Clyde D. McQueen, III; Benjamin P. Bauermeister; Jason L. Staczek; Michael S. DeLaurentis; Glenn G. Brooks, all of Seattle, Wash.

[73] Assignee: Hewlett-Packard Company, Palo Alto, Calif.

[21] Appl. No.: 221,806

[22] Filed: Apr. 1, 1994

[51] Int. Cl.$^6$ .................................................... G06F 15/00
[52] U.S. Cl. ........................................ 395/167; 395/326
[58] Field of Search ................................. 395/150, 151, 395/155; 382/190, 195, 198, 200

[56] References Cited

U.S. PATENT DOCUMENTS 5,142,613  8/1992  Morikawa et al. ..................... 395/110

OTHER PUBLICATIONS

Simpson, *Mastering WordPerfect 5.1 & 5.2 for Windows*, Sybex, 1992, 1993 pp. 138–140 and now pp. 141–142.
Mendelson, "The great font face–off: TrueType vs. ATM", *Windows Sources*, Apr. 1993, vol. 1, No. 3, p. 333.
Stinson, "Font management make Windows faster", *PC–Computing*, Jul, 1993 vol. 6, No. 7, pp. 262–264.
Simpson, *Mastering WordPerfect 5.1 & 5.2 for Windows*, Sybex, 1992, 1993.
Moore, "ElseWare Technologies Promise More Efficient Font Portability", *PC Week*, vol. 10, No. 17, pp. 39–41, May 3, 1993.
Pepper, "PageMaker 5.0 bests QuarkXPress in heated DTP race"*PC/Computing*, Mar. 1, 1993, vol. 6, No. 3, pp. 40–44.
Moore, "Microsoft extends Mac TrueType; font pack augments cross–platform goal", *PC Week*, Mar. 15, 1993, vol. 10, No. 10, p. 34.
Bauermeister, "A Manual Of Comparative Typography–The Panose System", Van Nostrand Reinhold Company (1988).
ElseWare Corporation, "Panose Classification Guide", (1991, 1992, 1995), title page through p.72.

*Primary Examiner*—Mark K. Zimmerman
*Assistant Examiner*—Joseph R. Burwell
*Attorney, Agent, or Firm*—Ronald M. Anderson

[57] ABSTRACT

A method for managing a plurality of different fonts that are installed on a computer. Raw font data for the plurality of fonts are stored in files on a computer hard disk (34). At least some of the fonts for which a character set is defined by the raw data are installed in the graphics user interface operating system running on a computer. The installed fonts are listed in a file (40). The method enables a user (22) to create one or more font menu lists (28) that are displayed to the user whenever selection of a font for use in a document by an application is desired. The font menu lists are subsets of the complete list of installed fonts on the operating system. Applications (42) can access any of the fonts installed on the system, but whenever a font must be selected by the user for use in a document, a more limited list of fonts appropriate for the application then running on the computer is displayed, reducing confusion as to the appropriate fonts that should be considered. Fonts are also generated on-the-fly, using PANOSE™ numbers, if a font required for use in a document by an application is not installed. Special fonts, which are defined by PANOSE™ numbers and other data that fine tune the PANOSE™ number description, are included in the list of installed fonts, and are also generated on-the-fly.

30 Claims, 10 Drawing Sheets

FONT MANAGER WITH SELECTIVE ACCESS OF INSTALLED FONTS

FIELD OF THE INVENTION

The present invention generally relates to a method for managing fonts installed on a computer, and more specifically, to a method for determining the fonts that are presented to a user when a selection is made of a font for use in an application running on the computer.

BACKGROUND OF THE INVENTION

The increasing popularity of the graphics user environment on personal computers and the ease with which word processing and desktop publishing can be implemented in a what you see is what you get (WYSIWYG) fashion has made people more aware of the variety of fonts that are available for use in such programs. As people become more knowledgeable about fonts, they begin to recognize that there are subtle differences between fonts that are generally similar in appearance. Further, fonts that are appropriate for newsletters are not appropriate for use in technical documents. Thus, it is important to use the "right" font for a particular application. As a result, avid computer users tend to continually add fonts to their collection and may find that they have literally hundreds of fonts installed on their system.

Keeping all of these fonts installed so that they can be used immediately ensures that a needed font is always available, but also can make the task of selecting a desired font for use in a particular application somewhat daunting. Typically, an application that allows a font to be selected presents the user with a menu of all of the installed fonts from which to make a choice. The difficulty of picking one font from several hundred installed on the system may be sufficiently frustrating to eventually lead the user to reduce the number of fonts listed when the font menu is selected, by deleting (deinstalling) many of the fonts. The fonts previously installed and then deleted continue to reside as raw font data files on a hard drive of the computer, but they are not installed in the graphics user interface system and thus, are not presented to the user when it is necessary to select a font in an application.

However, there is a significant drawback to dealing with the problem of too many fonts by deinstalling some of them. If after reducing the number of fonts installed, the user subsequently runs an application that requires one of the fonts that was previously installed but subsequently deleted, the user must then reinstall the font. For example, if the user needs to open a document that incorporates one of the deleted fonts that was previously installed, it will be necessary to reinstall the font. However, the deinstallation and reinstallation of fonts can be tedious and inefficient if repeated very often. Alternatively, the user can accept a replacement or substitute font selected by the operating system from among those fonts that are still installed, but the replacement font may be such a poor match to the original font that it is unacceptable. In addition, the replacement font may not produce the same length lines and can cause changes in page breaks.

Clearly, what is needed is a font manager that can provide the user with a short and manageable list of fonts, but not require that fonts excluded from this short list be deinstalled and therefore unavailable when needed by an application. Any application requiring a font that is installed, even though not among the short list presented to the user, should still be provided for use in documents in which that font is specified. For those fonts that are not installed, a replacement font that most closely resembles the required font should be provided. Characteristics of fonts should be defined objectively, so that the user is not forced to rely simply on similar sounding names when selecting a font for a particular use. Furthermore, assistance should be provided to the user in selecting the "right" font for a particular job from among those that are available for use. The present invention addresses these issues.

SUMMARY OF THE INVENTION

In accordance with the present invention, a method for managing a plurality of fonts installed in a system running on a computer is provided. The method includes the steps of enabling a user to create a subset of the plurality of fonts installed on the system by selecting specific fonts from among the plurality of fonts. The plurality of fonts are available for access and use in documents by applications running on the computer, even though not included in the subset. A user is enabled to add or delete fonts to and from the subset respectively, without affecting the plurality of fonts installed on the system and without affecting the availability of the plurality of fonts for use in documents by applications running on the computer. Only the subset of fonts defined by the user are displayed when the user elects to select a font for use in a document by an application. The subset of fonts thus displayed reduces confusion by the user in selecting one of the fonts, since the choice can be made from less than the plurality of fonts installed on the system.

The method further includes the step of defining a plurality of different subsets of fonts, each subset including fonts selected by the user for use in documents by corresponding different types of applications running on the computer. Applications running on the computer use any font required from among the plurality of fonts installed on the system in documents, including fonts not included in the subset.

The step of enabling the user to select one of the fonts further comprises the step of graphically presenting a plurality of font parameters to the user. The user selects specific ones of the font parameters to determine the fonts to be included in the subset.

In addition, the method includes the step of creating an application specific subset of the plurality of fonts installed on the system, independent of any selection made by the user. The application specific subset is presented to the user when the user elects to select a font to be used in a document by the corresponding application. Changes in the application specific subset of fonts can be made by the user.

Another step of the method is that of enabling the user to select fonts for inclusion in the subset from among a plurality of special fonts that are not installed on the system prior to use. Instead, such fonts are simply listed among the plurality of fonts installed on the system. When the user selects one of the special fonts from the subset for use in a document by an application running on the computer, the special font selected is generated on-the-fly, using data that define characteristics of the special font.

Yet another step is that of displaying samples of the plurality of fonts installed on the system to enable the user to select fonts for inclusion in the subset from among the plurality of fonts installed on the system. The selection is then based on a visual appearance of the font.

The fonts of the subset are presented to the user for use in documents by applications preferably running under a graphics operating system on the computer. The method can include the step of providing a font advisor that recommends specific fonts be included in the subset for use in corresponding specific types of documents. The step of enabling the user to select the font then includes the further step of enabling the user to select from among a plurality of styles that affect the specific fonts recommended by the font advisor.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
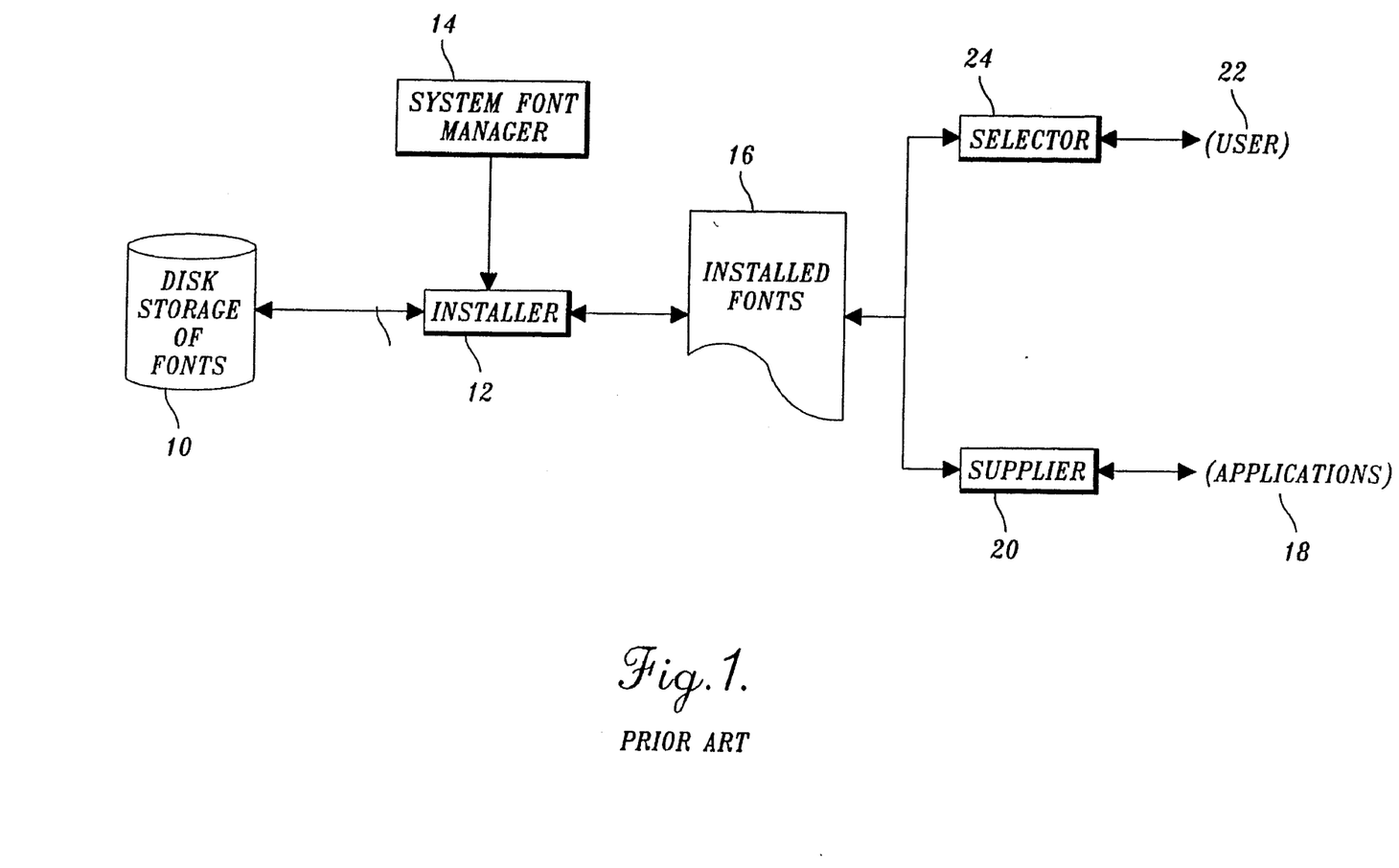
FIG. 1 is a block diagram illustrating how font management is handled in the prior art.

FIG. 1 is a block diagram functionally illustrating a font management paradigm used in the prior art for managing the selection and use of fonts on computers, e.g., personal computers. Typically the fonts, i.e., files identifying the fonts by name and files of raw font data describing and defining the outlines or shapes of the characters comprising the fonts, are stored on a hard disk 10 of a computer. An installer application 12 and a system font manager 14 are provided in the operating system running on the computer for installing selected fonts stored on the hard disk 10. In particular, when setting up a graphics user interface operating system, such as Microsoft Corporation's WINDOWS™ graphics user interface operating system, a user utilizes a system font manager 14 to install a selected font stored on the hard disk 10 as raw font data. When system font manager 14 causes installer application 12 to install a particular font, the font is added to a list of fonts in a file 16 of installed fonts. In the WINDOWS™ graphics user interface operating system, this file is the win.ini file. The installed fonts in file 16 are the fonts that are available to an application running on a computer. In particular, a supplier 20 provides an interface between applications 18 and the installed fonts in file 16. Supplier 20 is part of the software comprising the graphics user interface system.

When any of applications 18, e.g., a word processing program, requests a font, supplier 20 searches the installed fonts listed in file 16 for the requested font, and if available, provides the application with the requested font. If the requested font is not among the list of installed fonts in file 16, supplier 20 provides a substitute or replacement font that is typically selected by the graphics interface operating system based upon similarities between the names of the requested font and the installed fonts.

A user 22 of one of applications 18, e.g., a word processing program, is given access to the installed fonts in file 16 through a selector 24. For example, when drafting a document with a word processing application, the user can select one of the fonts listed when a font menu is activated in the word processing application. The user then selects one of the installed fonts in file 16 that is displayed when the font menu is activated, and in turn, the word processing program requests that selector 24 provide the selected font via supplier 20.

It is clear from FIG. 1 that applications 18 and user 22 only have access to the installed fonts listed in file 16; further, this list of installed fonts may or may not include all of the fonts contained on hard disk 10. Thus, if one of applications 18 requests a font via supplier 20 that is not one of the installed fonts in file 16 but is one of the fonts stored on hard disk 10, the application is not able to use the font. Rather, supplier 20 selects a substitute from the list of installed fonts in file 16. Similarly, selector 24 only makes the list of installed fonts in file 16 available for selection by user 22 when the user activates a font menu, but that list may not include all of the stored fonts on hard disk 10.

In order for the user and application to be able to use a font that is stored on the hard disk 10 but not contained in the list of installed fonts in file 16, the font must first be installed using system font manager 14 and installer 12. On the other hand, if the list of installed fonts 16 becomes so long that it is difficult for a user 22 to select a font, e.g., from a menu listing hundred of installed fonts, system font manager 14 and installer 12 would typically be used to deinstall some of the fonts. As noted above in the Background of the Invention, once a font is deinstalled, it is no longer available to applications or to the user, unless reinstalled.

As the foregoing discussion illustrates, in prior art font manager systems, the system font manager 14 and installer 12 must frequently be used to maintain a manageable list of fonts that is presented to user 22 when a font menu item is selected, and to provide the fonts that are required in documents created in various applications. In other words, in prior art font management systems, there is a tendency to frequently deinstall and reinstall fonts—a practice that is generally tedious and time consuming.

Figure 2:
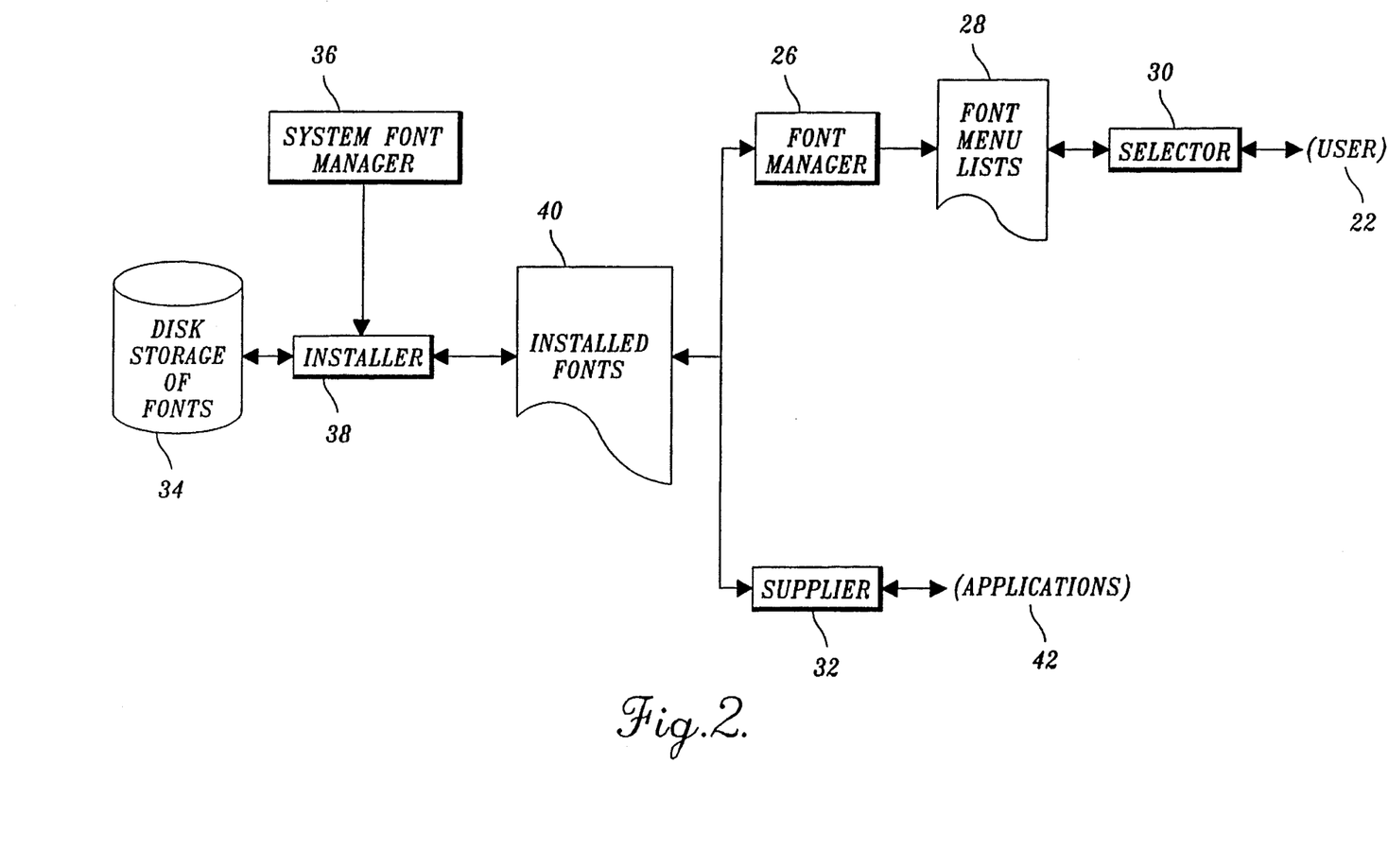
FIG. 2 is a block diagram illustrating a font management system incorporating enhancements provided by the present invention.

The block diagram of FIG. 2 illustrates how the present invention solves this problem. In particular, the present invention includes a font manager 26 that generates font menu lists 28, a selector 30, and a supplier 32. As in the prior art system illustrated in FIG. 1, raw font data files are stored on a hard drive 34, and a system font manager 36 in conjunction with an installer 38 is used to install fonts into a file 40 (e.g., in the win.ini file of the WINDOWS™ graphics user interface operating system) that lists the installed fonts. However, unlike prior art font management systems, font manager 26 produces font menu lists that are subsets of the totality of installed fonts listed in file 40. When user 22 of any of applications 42 activates a font menu to select a font, selector 30 only enables the font menu to show the user the fonts contained in one of font menu lists 28. Thus, by creating appropriately composed and sized font menu lists 28 using the font manager 26, a user is presented with a more manageable list of fonts, which are specifically appropriate for the application in which the font is to be selected.

Even though the user is presented a font menu list that is a subset of the installed fonts 40, applications 42 have access to all of the installed fonts in file 40 via supplier 32. Consider, for example, the situation in which a word processing program is used to manipulate a document that contains one or more fonts not contained in the font menu list 28 but nevertheless contained in the list of installed fonts 40. The word processing program will be able to use these fonts, e.g., in priming the document, by accessing them via the supplier 32, even though they are not among the fonts shown to the user when the font menu in the word processing program is activated.

To provide applications 42 full access to the fonts stored on the hard disk 34, system font manager 36 and installer 38 are used to install all of the fonts on the hard drive 34 into the list of installed fonts in file 40. Applications 42 then have access to all of the installed fonts 40 via supplier 32. Even if a very large number of fonts are present in the list of installed fonts 40, the font manager 26 can be used to create smaller, more manageable font menu lists that are represented to the user for selective use in any specific one of applications 42. Preferably, the font menu lists 28 include a general font menu list that includes fonts more generally used without regard to the application, and application specific font groups. Font manager 26 is able to selectively produce a default general font menu list and default application specific font groups. The default application specific font group for an application can include only the fonts installed when the application was originally installed in the graphics user operating system. Alternatively, fonts included in an application specific font group can be determined using a look-up table (not shown) that lists a plurality of applications 42 and corresponding recommended fonts appropriate for each of these applications, to produce the application specific groups for each application installed on the hard disk, including in each such group the recommended fonts that are also installed on the hard disk and listed in file 40. A user can then use font manager 26 to modify any of font menu lists 28, by adding or deleting fonts of the user's choice to and from the default font groups. It is also contemplated that the fonts included in the application specific groups can be determined based on specific characteristics of the installed fonts that are appropriate for the various applications installed in the graphics user operating system. For example, certain fonts include mathematical symbols that are used in writing equations and would (if included in the installed fonts) be included in the application specific font group produced by font manager 26 for MATH-CAD™, an application used for solving mathematical problems.

Figure 3:
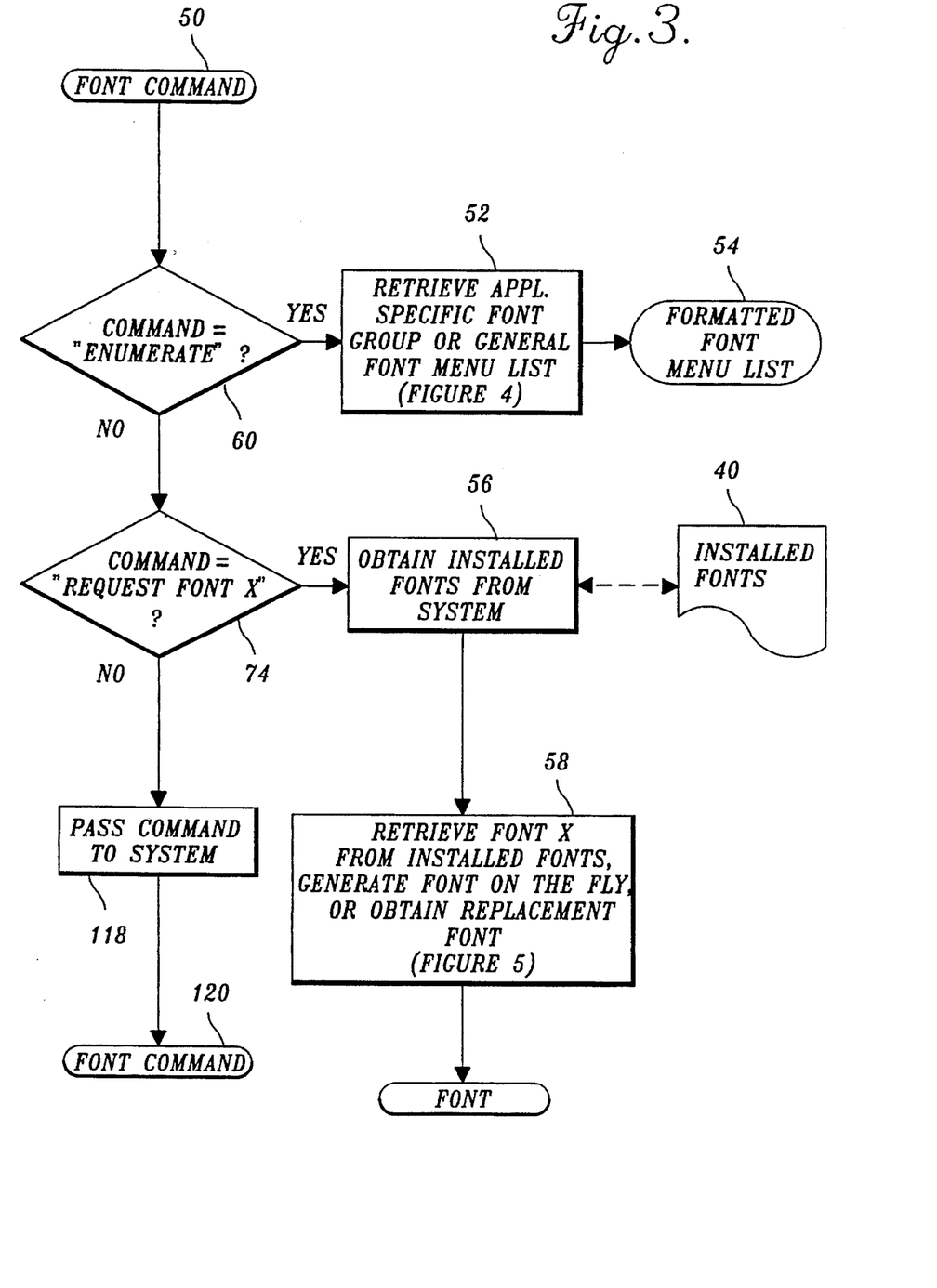
FIG. 3 is a flow chart illustrating how font menu lists are presented to a user and how fonts are obtained for applications, in accordance with the present invention.

Now that the invention has been generally described, the invention will be described in more detail, with reference to the remaining Figures. FIG. 3 is a flow chart that illustrates the operation of selector 30 and supplier 32. Font commands generated by applications 42 are intercepted by the font management system. In the preferred embodiment, installation of the software comprising the present invention in the WINDOWS™ graphics user interface operating system changes the *system.ini* file so that this intercept occurs any time that one of the applications or the user attempts to select one of the fonts. The process illustrated in the flow chart of FIG. 3 begins when a font command 50 is intercepted. If a user is requesting activation of a font menu to select a font, one of font menu lists 28 is retrieved and displayed to the user, as indicated generally by blocks 52 and 54, which represent the steps performed by selector 30. On the other hand, if an application is requesting a particular font, that font (or a replacement font if the requested font is not installed in file 40) is retrieved by supplier 32, as illustrated generally by blocks 56 and 58.

Figure 4:
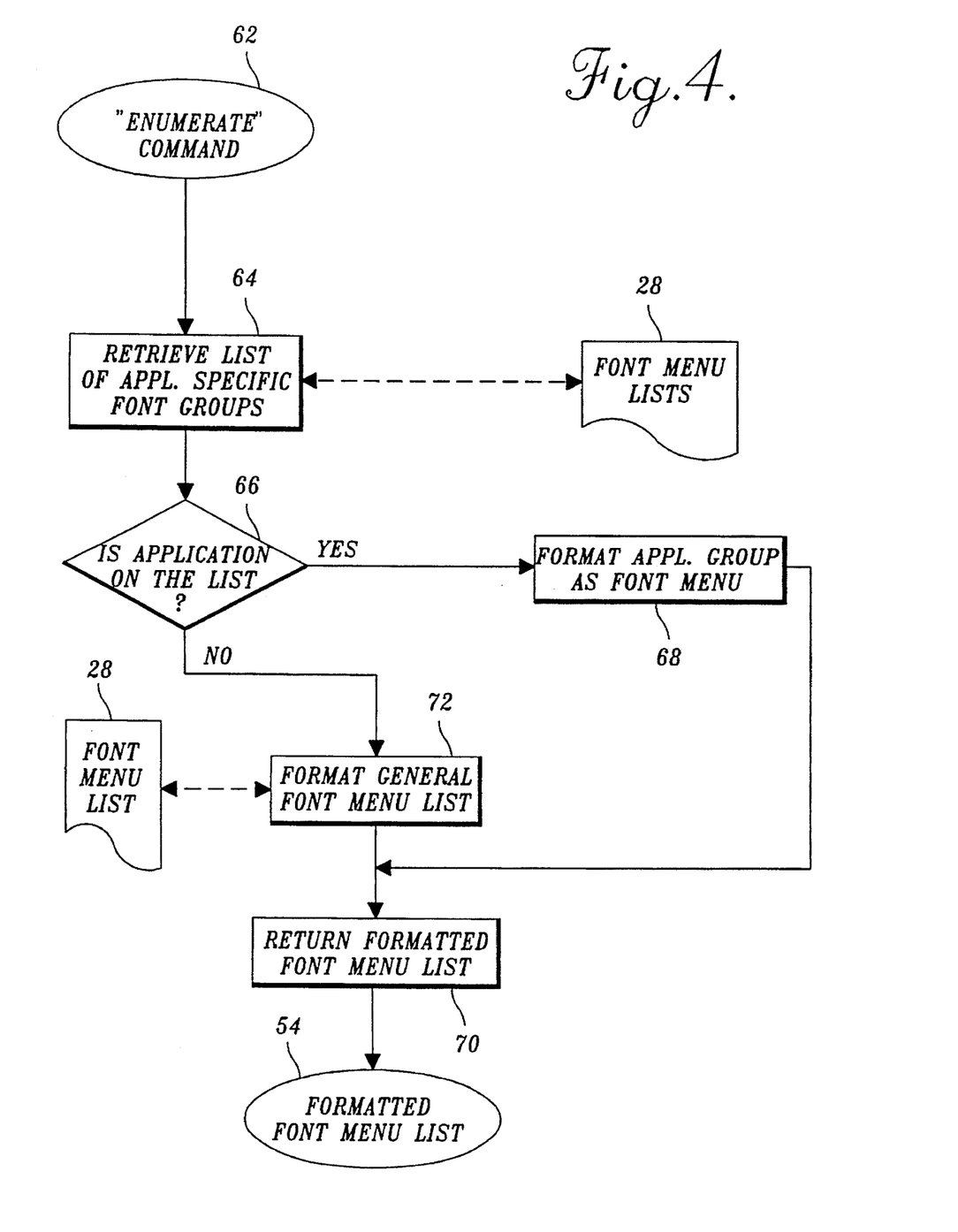
FIG. 4 is a flow chart illustrating in detail how a font menu list is presented to a user in the new font management system.

More particularly, when font command 50 is intercepted, the logic first determines whether the font command is requesting that a list of fonts be enumerated for display to the user, as indicated by a query 60. If yes, an application specific font group (corresponding to the application then running) or the general font menu list is retrieved from the font menu lists 28 (block 52). The details of how this step is accomplished are illustrated in FIG. 4. Upon receipt of an "enumerate" command 62, the list of application specific font groups in the font menu lists 28 are retrieved, as indicated by a block 64. Then, at a query 66, a determination is made as to whether an application specific font group exists for the application that generated the "enumerate" command. If a corresponding application specific font group does exist, the application specific font group is formatted for display as a font menu listing, as indicated by a block 68. Then, the formatted menu list is returned to the application that generated the "enumerate" command, as indicated at a block 70, so that the output displayed to the user is formatted font menu list 54.

If, on the other hand, at query 66, it is determined that an application specific font group does not exist that corresponds to the particular application making the "enumerate" command, the general font menu list contained in the list of font menu lists 28 is formatted as a menu, as indicated at a block 72. This general font menu list is then returned as the formatted font menu list displayed to the user, at block 70.

If the font command 50 is not requesting an enumeration of a list of fonts, program control flows from query 60 to a query 74 (FIG. 3). At query 74, a determination is made as to whether the font command 50 is requesting to use a particular font X. If yes, a list of the installed fonts 40 is obtained from the operating system. Specifically, as indicated in block 58, the requested font X is retrieved from the installed fonts listed in file 40, or if font X is not present in the installed fonts listed in file 40, either a suitable font ("special font") is generated on-the-fly or a replacement font is obtained from the list of installed fonts. Details of these alternatives that are embodied in block 58 are discussed below.

Figure 5:
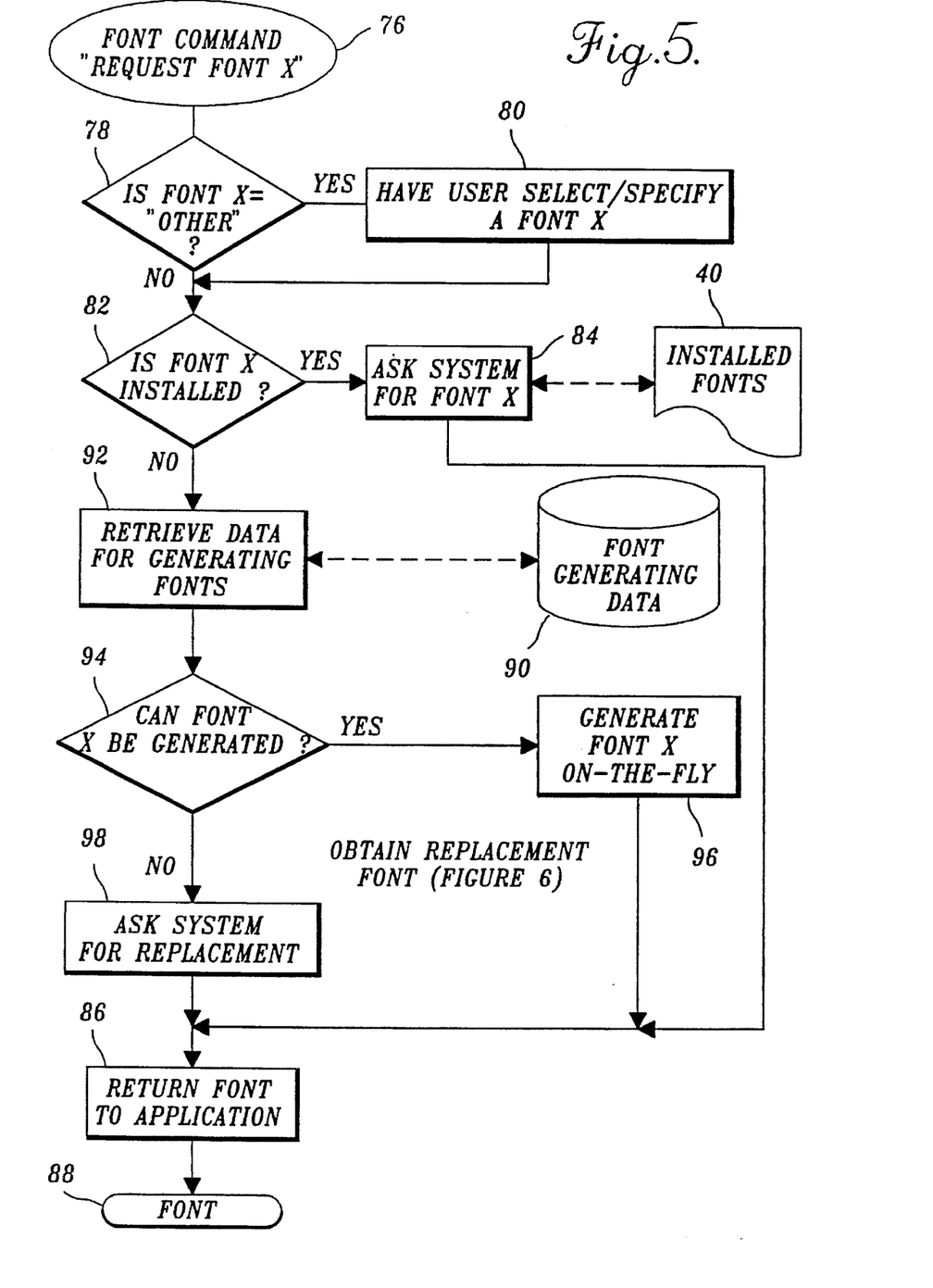
FIG. 5 is a flow chart illustrating how a font is obtained for use in an application.
Figure 9:
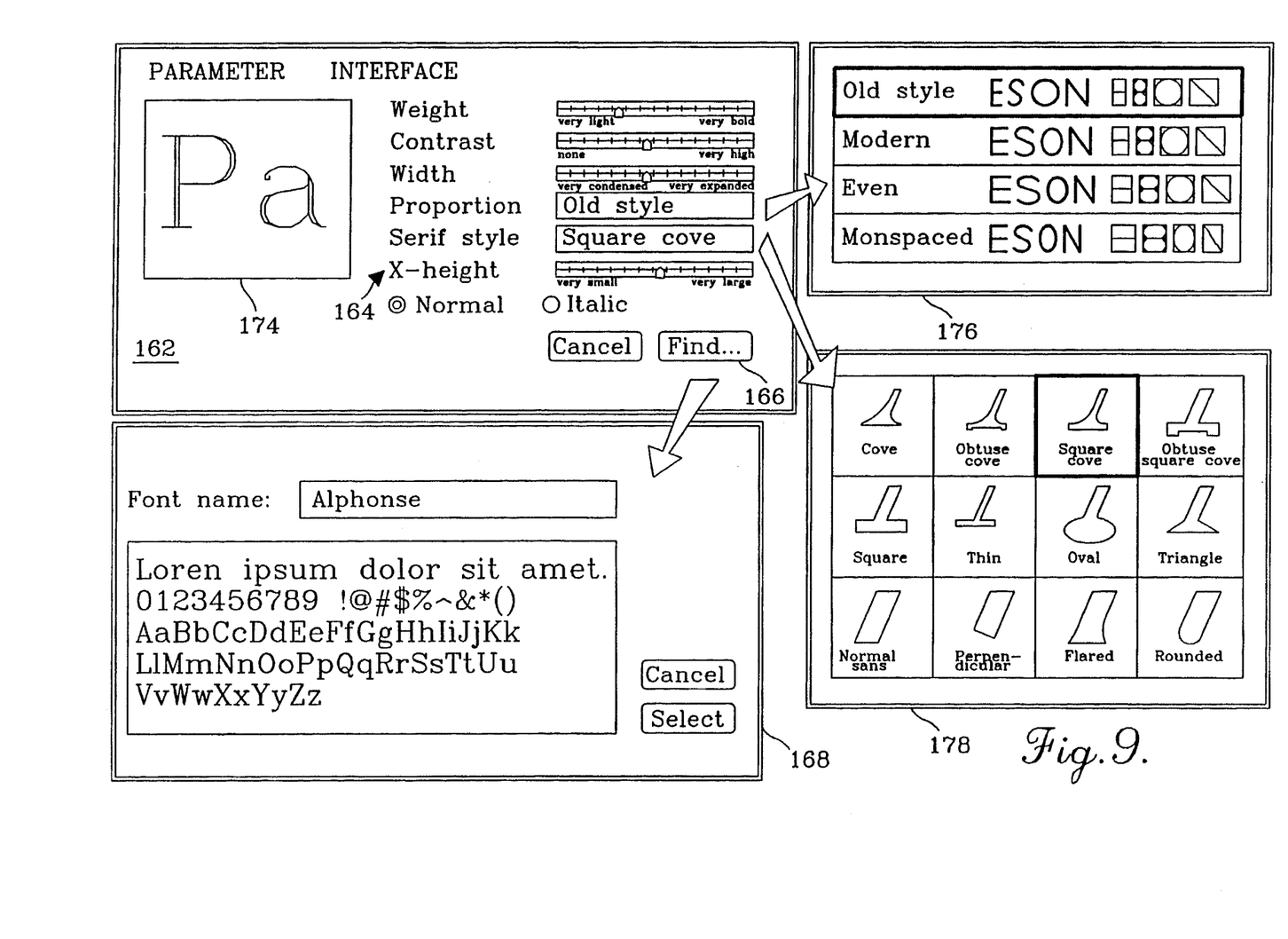
FIG. 9 illustrates a screen display that is presented to enable a user to select fonts to be added to a font menu list.

The specific steps for retrieving a font are illustrated by the flow chart in FIG. 5. A font command in a block 76 requesting font X is processed by first determining whether font X is identified by a key word that must be specially processed. For example, in the preferred embodiment illustrated in FIG. 5, the word "OTHER" is a key word that can be included in a font menu list 28 as one of the possible choices of fonts presented or displayed to the user. This option, if chosen, allows the user to select a font that is not specifically listed by name in one of the font menu lists 28. Instead, the user is presented with a screen display that offers various parameters determining the appearance of the font so that the user can specify the font by selecting from among the parameters. An example of the screen presented to the user for this purpose is illustrated in FIG. 9. The user may select "OTHER" if he does not know the name of a font that is desired, but the appearance of the font desired is known. In this way, even though the user is presented with one of font menu lists 28 that generally would be relatively small, by selecting the "OTHER" entry, the user gains access to additional fonts, e.g., all of the installed fonts 40 or one of the special fonts that is generated on-the-fly. In particular, at a query 78, a determination is made as to whether font X is the "OTHER" selection. If yes, the user is presented with an expanded font menu screen like that of FIG. 9, which is discussed in detail below, and the user is enabled to select or specify an actual font, as indicated by a block 80. Alternatively, by selecting "OTHER," the user will be presented a list of all of the installed fonts in file 40. Upon selection or specifying an actual font X based upon the initial selection of "OTHER," the font selected or specified can optionally be added to the particular font menu list 28 from which the user selected "OTHER." Alternatively, the selected font is simply retrieved or generated on-the-fly without adding the font to the font menu list.

Either way, the selected font X is obtained as illustrated by the remaining steps in the flow chart of FIG. 5. If, at the decision block 78, a determination is made that the "OTHER" selection was not selected, these steps are performed to obtain font X. First, as indicated by a decision block 82, a determination is made as to whether font X is installed in the list of fonts in file 40. If font X is installed, the font is retrieved from the installed fonts. In particular, a request is made to the operating system for font X, as indicated at a block 84. Then, as indicated at a block 86, the requested font is returned to application 42 that generated the request font command, and the output of the process illustrated in FIG. 5 is a font, as indicated by a block 88.

On the other hand, if at decision block 82 a determination is made that font X is not among the installed fonts listed in file 40, an attempt is made to generate the font on-the-fly. In particular, certain special fonts are provided with the software of the present invention and are added to the installed fonts listed in file 40, but are not actually defined or described in any raw data files on the hard drive of the type that are used for most other fonts, such as conventional TRUETYPE™ fonts. Instead, font generating data 90 comprising PANOSE™ numbers and other non-conventional specification data are provided for generating all of the characters of these special fonts on-the-fly. The PANOSE™ number for a font is a multi-digit number, each digit of which specifies a particular characteristic of the font. The remainder of font generating data 90 are parameters that fine tune the use of the PANOSE™ numbers to more accurately determine each character of the special fonts included in the list of fonts in file 40. The advantage of storing the font generating data instead of fully installing the special fonts as conventional fonts, is that the font generating data for these special fonts require only a few kilobytes of data rather than the tens or hundreds of kilobytes of data that are required for defining the characters of conventional fonts, so that less system hard drive storage is used for each special font. In particular, at a block 92, the font generating data are retrieved. Then, at a decision block 94, a determination is made as to whether font X can be generated from the font generating data 90. If yes, the font is generated on-the-fly based upon the font generating data 90, as indicated at a block 96. The generated font is then returned to the application requesting the font, as indicated at block 86.

On the other hand, if at decision block 94 a determination is made that font X cannot be generated from font generating data 90, possibly because the requested font is not among the special fonts that were installed, a replacement font is determined, as indicated at a block 98. The particular steps for obtaining the replacement font are illustrated in the flow chart of FIG. 6. With reference to that Figure, upon receiving a request 100 for a replacement for font X, a determination is first made as to which font replacement procedure has been selected by the user, as indicated at a block 102. In the preferred embodiment illustrated in FIG. 6, either supplier 32 is designated to find the replacement font, or the graphics user interface operating system is required to obtain the replacement font—depending upon the prior election of the user. If the graphics user interface operating system has been selected to find the replacement font, the conventional steps are followed by it, as indicated at a block 104, resulting in the output of a replacement font, which is indicated in a block 108.

Figure 6:
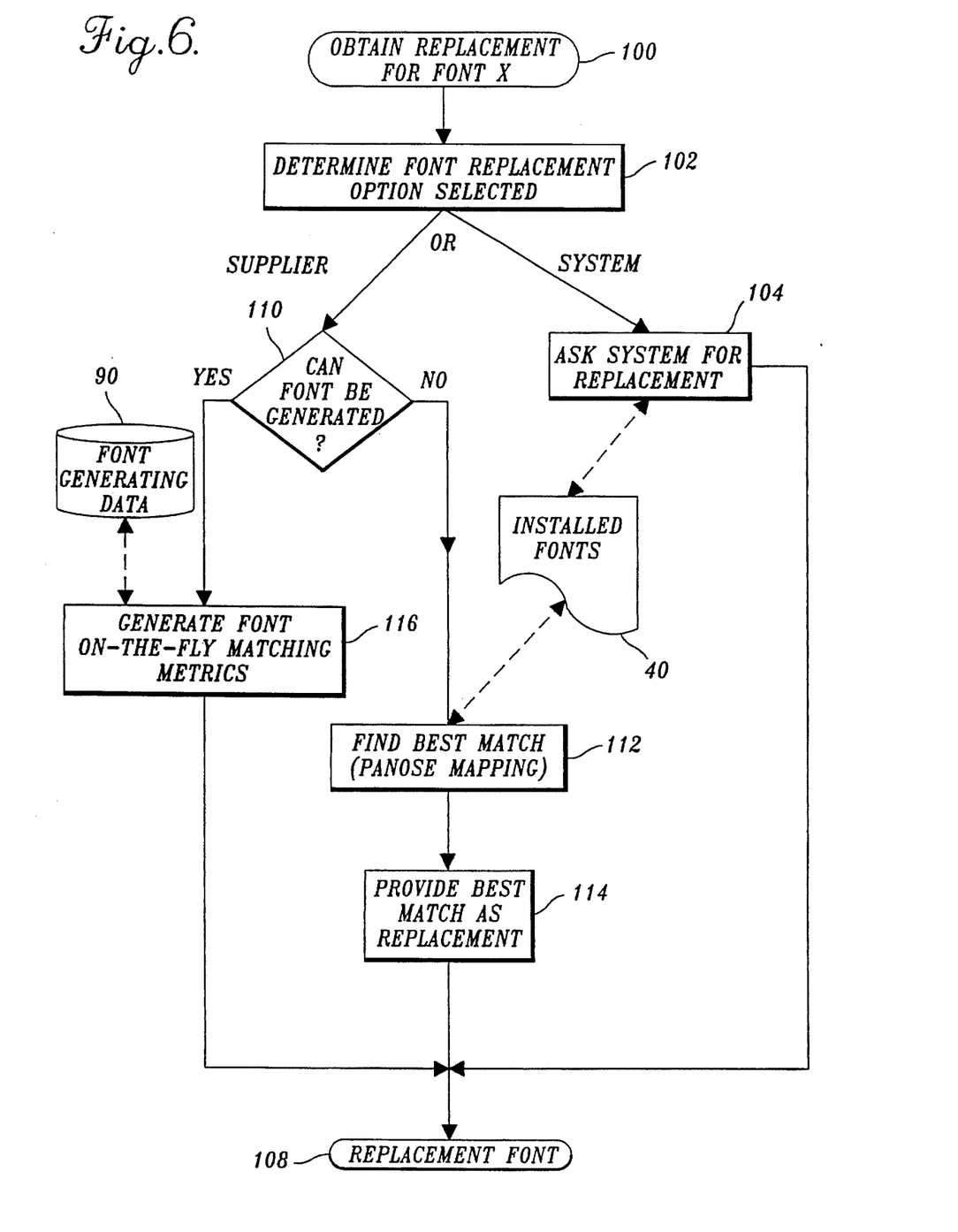
FIG. 6 is a flow chart illustrating how replacement fonts are obtained.

Generally, the graphics user interface operating system finds a replacement font from the list of installed fonts in file 40 based upon a font name association mapping procedure. Unfortunately, such schemes often do not produce a very good match with the requested font, and the appearance of the replacement font can be significantly different from that desired. As a result, the width of the replacement font is frequently different than the requested font so that the overall alignment of the lines of a document in which the font is used is altered, resulting in altered pagination in documents in which the replacement font is used. This change in the font characteristics and its effect on pagination can have a significant impact on the appearance of such documents and on the placement, for example, of charts or other diagrams within those documents.

Thus, it is normally preferable for the user to have supplier 32 provide a replacement font using a more sophisticated replacement procedure provided by the present invention In the preferred embodiment shown in FIG. 6, supplier 32 first determines if a replacement font can be generated, as noted in a decision block 110. If not, the supplier finds the best match among the installed fonts in accordance with a block 112, by comparing the PANOSE™ number of the requested font with the PANOSE™ numbers of the installed fonts, both conventional and special, to determine a replacement font. The replacement font will have the least differences between specific digits of the PANOSE™ number for the requested font of any of the installed fonts listed in file 40. By using this PANOSE™ mapping technique, the closest matching font in the installed fonts is selected as the replacement font for the requested font, as indicated at a block 114. The logic then proceeds to block 108, yielding the replacement font.

On the other hand, if a replacement font can be generated at decision block 110, a font is generated on-the-fly, as indicated at a block 116. In particular, font generating data 90 comprising the PANOSE™ number of the requested font are used to generate a replacement font that matches the matrix, i.e., overall height and width, of the requested font, and many of its other characteristics. Regardless of how the replacement font is obtained, the output of the process illustrated by FIG. 6 is the replacement font, as shown in block 108.

If, at decision block 74 in FIG. 3, a determination is made that font command 50 is not requesting a font, then font command 50 is passed to the graphics user interface operating system in a block 118, to implement functions not related to this invention. In this case, the font command 50 is neither an "enumerate" command or a "request font" command. The font command is implemented in a block 120.

Figure 7:
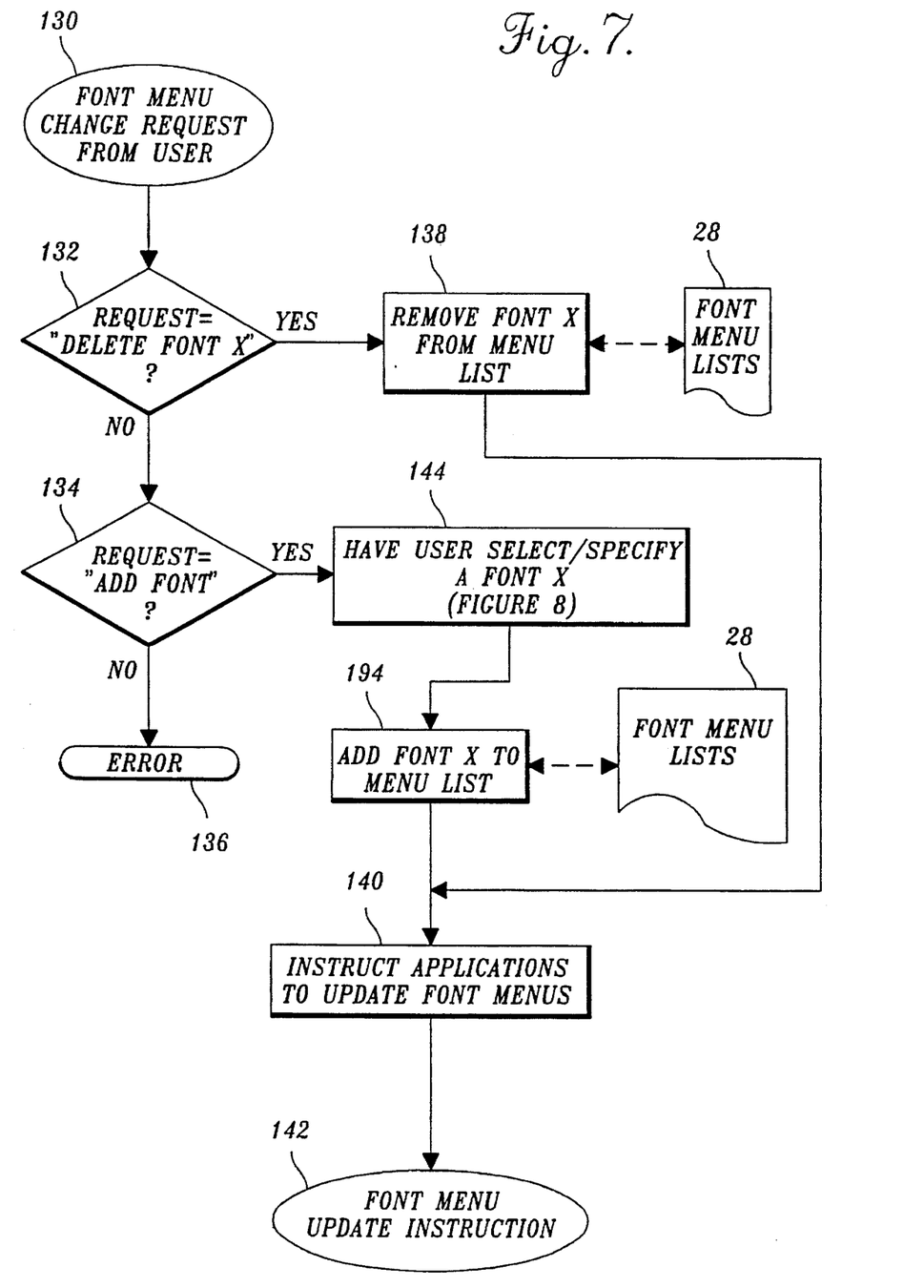
FIG. 7 is a flow chart illustrating the steps enabling a user to change font menu lists.

Operation of font manager 26 to generate font menu lists 28 is described with reference to the flow chart in FIG. 7. The font manager 26 enables the user to add or delete fonts included in the application specific font groups and the general font menu list. By changing font menu lists 28, the user is able to customize the list of fonts that are presented to the user by selector 30. The process illustrated in FIG. 7 begins with a font menu change request 130 that is made by the user. A determination is made at decision blocks 132 and 134, respectively, as to whether the user wants to delete a font or add a font to a particular font menu list. If the user does not want to delete or add a font, the user has entered an improper request. In this case, the output of the process is an error indication in a block 136.

If at decision block 132 a determination is made that the user wants to delete a particular font X, that font is removed from a selected one of font menu lists 28, as indicated at a block 138. The user responds to a dialog in font manager 26 to select the font menu list that is to be changed, and the steps for selecting a particular font menu list are not specifically shown in FIG. 7. Alter font X is removed from the selected font menu list, an instruction is sent to all applications using this font menu list to update their font menus, as indicated at a block 140. The output of this process is a font menu update instruction in a block 142. If at decision block 134 a determination is made that the user has requested to add a font, the user is asked to select or specify a font X to be added, as generally indicated at a block 144.

Figure 8:
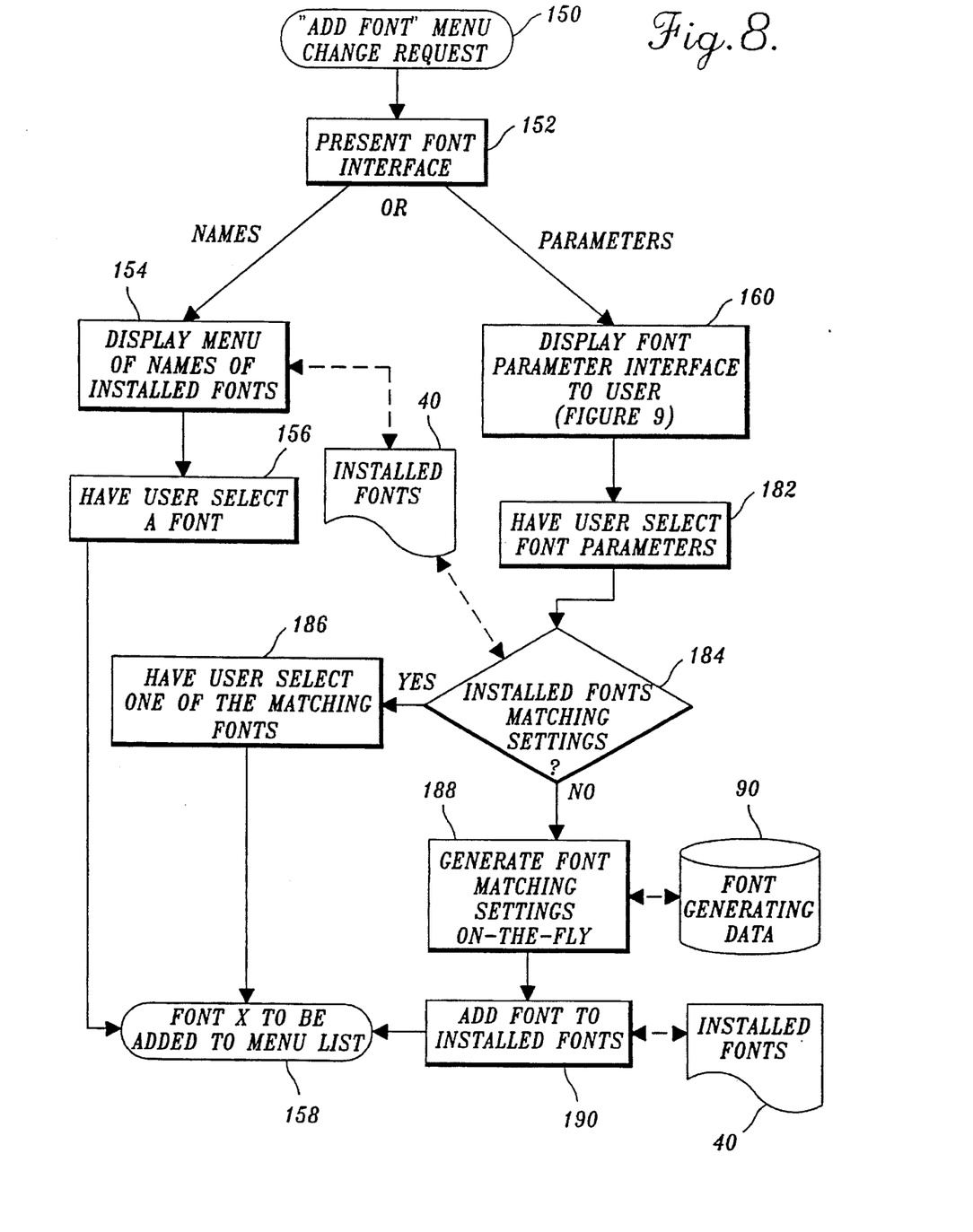
FIG. 8 illustrates further details of the steps that enable a user to add fonts to a menu list.

The actual steps followed when a user selects a font to be added are illustrated in the flow chart of FIG. 8, which begins with an "add font" menu change request in a block 150. The user is presented with a choice of font selection interfaces for selecting a font to be added to the menu list, as indicated at a block 152. FIG. 8 illustrates the process for two different font selection interfaces. One font selection interface presents the names of all installed fonts listed in file 40 and enables a user to select one of the installed fonts for addition to the menu list. The other font selection interface presents the user with a screen showing a plurality of font parameters from which the user chooses to specify a font. An exemplary copy of this screen is illustrated in FIG. 9.

If the font name interface format is used, a menu of all of the installed fonts listed in file 40 is displayed, as indicated at a block 154. This font selection interface also provide the user with an option to graphically display a specimen of the listed fonts, thereby enabling the user to make a choice based on appearance of the font as well as or in addition to selecting based upon the name of the fonts. The list of font names displayed in the menu can include special fonts that are generated on-the-fly, as previously explained. The user is asked to select a font from those listed at a block 156, and the selected font is the output of the process illustrated in FIG. 8, as indicated in a block 158.

If, on the other hand, the parameter font selection interface format is elected, the step at a block 160 causes the font parameter selection interface screen to be displayed. FIG. 9 illustrates one possible format for the font parameter selection interface. The displayed screen shown in FIG. 9 includes a screen 162 that allows a user to specify or choose among various font parameters. Parameters 164 illustrated in FIG. 9 include weight, contrast, stroke width, proportion, serif style, and x-height. A FIND command 166 is provided to cause the font manager to find a particular font or a plurality of fonts matching the selected parameters from among the installed fonts in file 40. If one or more fonts are found meeting the chosen font parameters, a graphical illustration window 168 is provided to display the name of each such font 170, along with a sample 172 showing the various characters comprising one of the fonts found. An enlarged view of an upper case and a lower case character of the font are illustrated in a window 174 of screen 162. Further graphical selection options are provided to assist the user in selecting and setting font parameters. For example, as illustrated by the windows 176 and 178, upon "clicking," e.g., with a mouse, upon one of the font parameter entry panels, window 176 opens, illustrating how the appearance of a font changes when the proportional character spacing parameters are changed, and window 178 opens to graphically illustrate the various serif styles that can be selected with the mouse by clicking on one of the illustrated examples.

Regardless of the particular parameter selection interface employed, the user must select particular font parameters, as indicated at block 182 of FIG. 8. Then, at decision block 184, a determination is made as to whether any of the installed fonts listed in file 40 match the particular parameter settings chosen by the user. If yes, the user is presented with a list of these matching fonts and asked to select one of the fonts, as indicated at a block 186. The list of matching fonts can also be presented as pan of the font selection interface screen shown in FIG. 9.

On the other hand, if at decision block 184 a determination is made that there are no installed fonts matching the particular parameter settings chosen by the user, a font matching the settings is generated on-the-fly, as indicated at a block 188, using the font generating data 90 (derived from the corresponding PANOSE™ number for the chosen font parameters). The generated font is then added to the list of installed fonts listed in file 40, as indicated at a block 190. Whichever path is followed through the flow chart of FIG. 8, the output of the process in block 158 is the font to be added to the particular menu list selected by the user. The font selected is added to the menu list at a block 194 in FIG. 7. After adding the font to the menu list, applications that use this font menu list are instructed to update their font menus, as indicated at block 140.

Font manager 26 offers another feature that assists the user in selecting a font for a particular type of document. Specifically, the user can initiate a font advisor, as indicated in a block 200 in FIG. 10. Once selected, the font advisor function displays a list of several different types of documents to the user, including: newsletter, spreadsheet, presentation, report, resume, schedule, sign, menu, magazine, letter/memo, book, fax, etc. Also displayed are buttons that enable to the user to select either a formal or an informal style and two list boxes that enable the user to select a desired impression. The impressions include: modem official, old-fashioned, traditional serious, soft, unusual, cute, dull, elegant, fancy, friendly, fun, hard, etc. The various types of documents and the stylistic impressions that are listed are drawn from a font advisor database 204. In response to the selection made by the user, the font manager determines a plurality of font pairs that are appropriate for the selected type of document and the styles selected by the user, using information drawn from the font advisor database, as indicated in a block 206. The recommended font pairs are displayed to the user in accordance with a block 208, so that the user can select the font pair to be used. Samples of the fonts are included in the display to assist the user in making the selection. The font pairs each include a display font and a body font suitable for use in the selected type of document.

Figure 10:
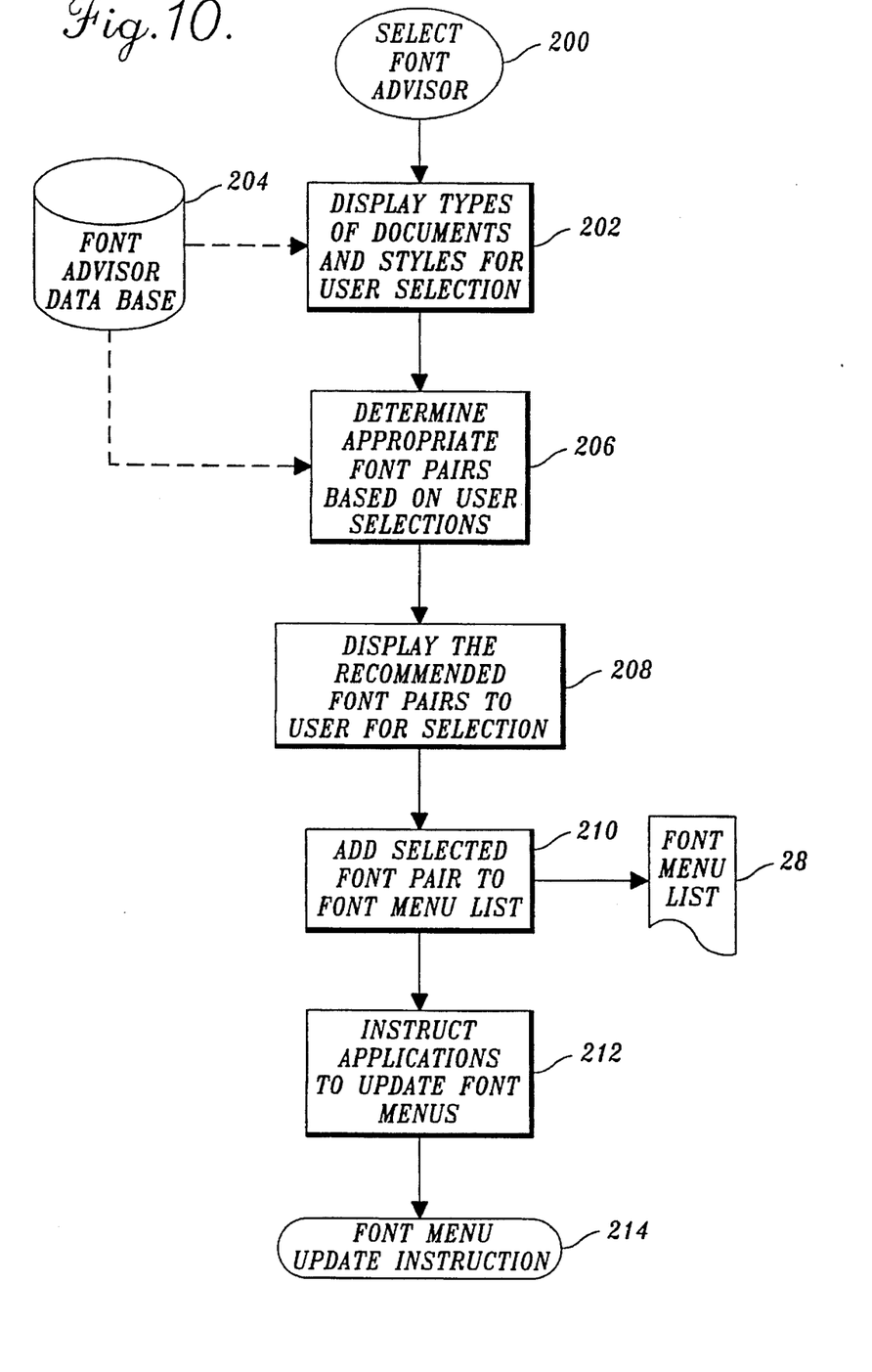
FIG. 10 is a flow chart showing the steps implemented when a user activates a font advisor to assist in selecting a font for a particular type of document.

The font pair selected by the user is added to font menu list 28, as shown in a block 210. The font manager then instructs the applications running on the computer to update their respective font menus, as noted in a block 212. A block 214 provides that the result of implementing this instruction is that the font menus are updated.

The preferred embodiment of the present invention has been disclosed for use in connection with the WINDOWS™ graphics user interface operating system. However, it is also contemplated the invention will be usable in connection with managing fonts installed in other operating systems, such as Apple Corporation's SYSTEM 7™ operating system, and even in operating systems that are not truly of the graphics user interface type.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for managing a plurality of fonts installed in an operating system running on a computer, comprising the steps of:

(a) installing a font manager program for use with the operating system running on the computer, said font manager program managing access by a user to the plurality of fonts installed in the operating system, within different applications;

(b) enabling the user to create a subset of the plurality of fonts installed in the operating system by selecting specific fonts from among said plurality of fonts using the font manager program, said plurality of fonts being available for access and use in documents by the different applications running on the computer even though not included in the subset created by the user with the font manager program;

(c) enabling a user to respectively add and delete fonts to and from the subset using the font manager program, without affecting the plurality of fonts installed in the operating system and without affecting the availability of the plurality of fonts for use in documents by any of the different applications running on the computer; and (d) displaying only the subset of fonts that were defined by the user using the font manager program when the user elects to select a font for use in a document, said subset reducing confusion of the user in selecting said font by displaying less than all of the plurality of fonts installed in the operating system when the user selects the font.

2. The method of claim 1, further comprising the step of defining a plurality of different subsets of fonts, each subset including fonts selected by the user for use in documents by corresponding different applications running on the computer.

3. The method of claim 1, wherein the applications running on the computer use any fonts required by the applications for use in documents from among the plurality of fonts installed on the system, including fonts not included in the subset.

4. The method of claim 1, wherein the step of enabling the user further comprises the step of graphically presenting to the user a plurality of font parameters that indicate shape and form attributes of characters comprising the plurality of fonts, the user specifying and selecting the font parameters to determine the fonts to be included in the subset.

5. The method of claim 1, wherein the step of enabling the user further comprises the step of graphically presenting to the user a plurality of font parameters that indicate shape and form attributes of characters comprising the plurality of fonts, the user specifying and selecting the font parameters to determine the font that will be used in the document.

6. The method of claim 5, wherein the subset includes an entry that is not a font name and which the user selects to indicate that the font used in the document will be determined by the user specifying and selecting the font parameters.

7. The method of claim 1, further comprising the step of creating an application specific subset of the plurality of fonts installed on the system, at least initially independent of any font selection made by the user, said application specific subset being displayed to the user when the user elects to select a font to be used when running the corresponding application.

8. The method of claim 1, further comprising the step of enabling the user to select fonts for inclusion in the subset from among a plurality of special fonts, said special fonts being treated as special because they are not installed on the system prior to use, but instead, are simply listed among the plurality of fonts installed on the system, selection of one of said special fonts from the subset by the user for use in the document by one of the applications running on the computer causing said one special font to be generated in real time using font generation data that define shape and attribute characteristics of characters comprising said one special font.

9. The method of claim 1, further comprising the step of displaying samples of the plurality of fonts installed on the system to enable the user to select fonts for inclusion in the subset from among the plurality of fonts installed on the system based on a visual appearance of the font.

10. The method of claim 1, wherein the operating system comprises a graphics user interface.

11. The method of claim 1, further comprising the step of providing a font advisor dialog that recommends specific fonts be included in the subset for use in different types of documents by corresponding specific types of applications.

12. The method of claim 11, wherein names of a plurality of fonts are displayed to the user by the font advisor, organized in a plurality of pairs of fonts, further comprising the step of enabling the user to select from among the plurality of pairs of fonts, each of said pairs of fonts comprising a body font, which is used for text in a body of a type of document identified by the user, and a display font, which is used for a title or a heading in said document.

13. The method of claim 1, further comprising the step of generating a replacement font having characteristics matching a font selected by the user for inclusion in the subset when said font that is selected is not among the plurality of fonts installed in the operating system.

14. The method of claim 13, wherein the replacement font is generated in real time based upon a number that specifies visual characteristics of the font selected by the user.

15. The method of claim 1, further comprising the step of generating a replacement font having characteristics matching a font requested by one of the applications when said font that is requested is not among the plurality of fonts installed in the operating system.

16. The method of claim 15, wherein the replacement font is generated in real time based upon a number that specifies visual characteristics of the font requested by said one of the applications.

17. A method for managing fonts and for selecting fonts for use in applications running under a graphics operating system on a computer, comprising the steps of:

(a) providing a supplementary font manager program to control access by a user to fonts installed in the graphics operating system, said supplementary font manager program operating as an interface between the installed fonts and the user;

(b) presenting a list of the fonts installed in the graphics operating system to the user with the supplementary font manager program;

(c) enabling the user to select at least one of the fonts installed in the graphics operating system to be a hidden font with the supplementary font manager program, said hidden font being so called because it is not displayed in a menu of fonts, said menu of fonts thus comprising less than all of the fonts installed in the graphics operating system;

(d) enabling the user to change the fonts in the menu of fonts using the supplementary font manager program; and (e) making all fonts that are installed on the graphics operating system available for use in documents by any application requesting them, even if said fonts include the hidden font, which is not displayed in a list of fonts from which the user may select a font within any application and is not included in the menu of fonts created by the user using the supplementary font manager program.

18. The method of claim 17, wherein the step of enabling the user to hide said at least one font comprises the step of enabling the user to graphically identify the fonts to be included in the menu of fonts by selecting the fonts to be included from the list of fonts installed in the graphics operating system.

19. The method of claim 17, wherein the list of fonts installed on the system includes special fonts, said special fonts being treated as special because they are not installed in the graphics operating system other than by name, but instead, are generated in real time when used in a document by an application running on the computer.

20. The method of claim 19, wherein the special fonts are defined by font generation data that specify shape and attribute characteristics affecting a visual appearance of characters comprising each special font, said data being stored in a file that is substantially smaller in size than a file required to store data that define a character set for a conventional font installed in the graphics operating system.

21. The method of claim 20, wherein the font generation data define the visual appearance of each font by specifying a serif style, a proportion, a contrast, a stroke variation, an arm type, a letterform, a midline, and a height of the characters comprising the font.

22. The method of claim 21, further comprising the step of specifying a replacement font for a specific font that is not installed in the graphics operating system, but which is requested by an application for use in a document, said replacement font being specified by selecting a special font from among those included in the list of fonts based upon the font generation data specifying the visual appearance of the specific font requested and the font generation data specifying the visual appearance of the replacement font, such that shapes and attributes of characters comprising the replacement font are substantially identical to shapes and attributes of corresponding characters comprising said specific font requested by the application for use in the document.

23. The method of claim 17, further comprising the step of grouping selected fonts from among the plurality of fonts installed in the graphics operating system into a plurality of different groups, based upon shapes and attributes of characters comprising each of the plurality of fonts, wherein the fonts comprising each of said groups are determined based upon font character characteristics chosen by the user.

24. The method of claim 17, further comprising the step of graphically displaying a plurality of different parameters that determine shapes and attributes of characters comprising the plurality of fonts to the user, to enable the user to select and set selected parameters from among the plurality of parameters, to determine the fonts included in the menu of fonts.

25. The method of claim 17, further comprising the step of providing a dialog for advising the user to employ specific fonts for use in an application running on the computer.

26. The method of claim 17, further comprising the step of enabling an application running on the computer to determine a subset of the fonts installed in the graphics operating system for use in documents, said subset being included in a menu of fonts presented to the user for selection and use in a document when running the application.

27. The method of claim 17, further comprising the step of generating a replacement font for a specific font that is not installed in the operating system when the specific font is requested by an application running on the computer for use in a document, the replacement font being generated using a number that specifies characteristics affecting a visual appearance of the specific font.

28. The method of claim 17, further comprising the step of generating a replacement font for a specific font that is not installed in the operating system when the specific font is selected by the user for use in a document, the replacement font being generated using a number that specifies characteristics affecting a visual appearance of the specific font.

29. The method of claim 17, further comprising the steps of displaying a plurality of font characteristics to the user; and enabling the user to specify a font for use in a document by an application running on the computer by selecting and setting the font characteristics.

30. The method of claim 29, wherein the plurality of font characteristics are displayed to the user if the user elects not to use any of the fonts that are included in the menu of fonts.

\* \* \* \* \*